(12) United States Patent
Visenzi

(10) Patent No.: US 11,453,453 B2
(45) Date of Patent: Sep. 27, 2022

(54) DEVICE FOR THE AUTOMATIC OPENING AND CLOSING OF A TOP BOX OR A SUITCASE FOR MOTORCYCLES AND FOR HOOKING AND RELEASING SAID SUITCASE OR TOP BOX TO/FROM THE MOTORCYCLE

(71) Applicant: GIVI S.p.A., Flero (IT)

(72) Inventor: Giuseppe Visenzi, Brescia (IT)

(73) Assignee: GIVI S.p.A., Fiero (IT)

( * ) Notice: Subject to any disclaimer, the term of this patent is extended or adjusted under 35 U.S.C. 154(b) by 366 days.

(21) Appl. No.: 16/754,869

(22) PCT Filed: Nov. 2, 2018

(86) PCT No.: PCT/IB2018/058625
§ 371 (c)(1),
(2) Date: Apr. 9, 2020

(87) PCT Pub. No.: WO2019/087143
PCT Pub. Date: May 9, 2019

(65) Prior Publication Data
US 2020/0317286 A1    Oct. 8, 2020

(30) Foreign Application Priority Data
Nov. 6, 2017 (IT) .......................... 102017000125709

(51) Int. Cl.
*B62J 9/24* (2020.01)
*H04W 4/80* (2018.01)
(Continued)

(52) U.S. Cl.
CPC . *B62J 9/24* (2020.02); *B62J 9/27* (2020.02); *B62J 9/30* (2020.02); *H04W 4/80* (2018.02)

(58) Field of Classification Search
CPC .......................................................... B62J 9/24
See application file for complete search history.

(56) References Cited

U.S. PATENT DOCUMENTS 4,907,428 A * 3/1990 Nakashima ................ B62J 9/40
70/279.1
2007/0285272 A1 12/2007 Umeda et al.
(Continued)

FOREIGN PATENT DOCUMENTS

| CN | 1203164 A | 12/1998 |
| CN | 101045475 A | 10/2007 |

(Continued)

OTHER PUBLICATIONS

International Search Report dated Jan. 3, 2019 in PCT/IB2018/058625 filed on Nov. 2, 2018.
(Continued)

*Primary Examiner* — Wen W Huang
(74) *Attorney, Agent, or Firm* — Oblon, McClelland, Maier & Neustadt, L.L.P.

(57) ABSTRACT

The present invention relates to a device capable of allowing both the opening and closing of a top box or a suitcase for motor vehicles, and the coupling and releasing of such top box or suitcase with respect to a support element, generally a special plate, solidly fixed to the motor vehicle. The device according to the present invention allows both manual locking and unlocking, by means of a key lock, and simultaneous lock of the buttons which respectively allow the opening and closing of the top box/suitcase and the coupling and releasing of said top box/suitcase from the support element, both the automatic remote activation, of only the opening/closing of the top box, through an electronic control unit, preferably configured, but not exclusively, with a Bluetooth communication module.

13 Claims, 9 Drawing Sheets

(51) Int. Cl.
*B62J 9/27* (2020.01)
*B62J 9/30* (2020.01)

(56) References Cited

U.S. PATENT DOCUMENTS

| | | |
|---|---|---|
| 2010/0065596 A1 | 3/2010 | Lim |
| 2011/0037277 A1* | 2/2011 | Visenzi .............. G07C 9/00896 |
| | | 292/58 |
| 2013/0168427 A1* | 7/2013 | Visenzi ..................... B62J 7/02 |
| | | 224/413 |
| 2013/0220231 A1* | 8/2013 | Hovsepian ................ B62J 9/24 |
| | | 119/496 |
| 2014/0137612 A1* | 5/2014 | Gresse .................... F16B 37/14 |
| | | 70/448 |

FOREIGN PATENT DOCUMENTS

| | | |
|---|---|---|
| CN | 107107981 A | 8/2017 |
| EP | 1 921 001 A1 | 5/2008 |
| EP | 2 630 0026 A1 | 8/2013 |
| JP | 2010-200961 A | 9/2010 |

OTHER PUBLICATIONS

Chinese Office Action dated Jan. 18, 2021 in Chinese Patent Application No. 201880069611.8 (with Translation of Categories), 5 pages.

\* cited by examiner

DEVICE FOR THE AUTOMATIC OPENING AND CLOSING OF A TOP BOX OR A SUITCASE FOR MOTORCYCLES AND FOR HOOKING AND RELEASING SAID SUITCASE OR TOP BOX TO/FROM THE MOTORCYCLE

FIELD OF THE INVENTION

The present invention relates to a device capable of allowing both the automatic opening and closing of a top box or a suitcase for motor vehicles, and the coupling and releasing of such top box or suitcase with respect to a support structure, generally a special plate, solidly fixed to the motor vehicle.

For the sake of brevity, hereinafter reference will be made to the use of the device in association with a top box, typically and as known, positioned on a specific luggage carrier structure provided integrally with the vehicle, however the entire description is intended as referring to any type of suitcase, also soft, also lateral, intended to be connected to a fixed support which is integrally connected to the vehicle in turn.

The device according to the invention makes it possible to both simultaneously operate on the means adapted to allow the opening/closing of the top box and on the means adapted to allow the coupling/releasing of the top box from the support element, and to selectively operate only on the means for opening/closing the top box, without operating on the means for coupling/releasing the top box from the support element.

A further feature of the device according to the present invention is that it can be operated remotely, without the use of the key commonly used to operate the lock.

STATE OF THE ART

The use of top boxes, suitcases or bags in the field of motorcycles which are adapted to house luggage, helmets or other accessories is known, which are removably fixed to a dedicated support element provided on the vehicle, for example a rear luggage rack or a supporting frame for side suitcases.

A top box is usually associated with a luggage rack provided in the rear area of the vehicle behind the seat, while bags and luggage are generally associated with support frames still provided in the rear area, but in the lateral area of the vehicle, according to known aspects.

In both cases special support elements are generally provided, consisting for example of a support plate.

This support plate is stably fixed to the luggage carrier or to another structure of the same motor vehicle, and the top box/bag/suitcase is generally provided with hooking means for hooking to said support plate.

Usually said hooking means are suitable for creating a removable coupling of the top box/suitcase with the support plate, and are provided at the lower face of the top box/suitcase, which can be made of either plastic or metallic material or in other suitable materials.

The hooking means normally comprise a sliding latch element, able to engage with a special projection provided in the support plate to firmly constrain the top box/suitcase to the plate itself.

A button release mechanism, possibly fitted with a safety lock, makes it possible to retract the latch to release the top box/suitcase from the relative support plate.

A suitcase or top box for motor vehicles equipped with a device capable of carrying out both the opening and closing of the top box itself, and of obtaining its coupling and releasing with respect to a support element integral with the motor vehicle, is described for example in patent no. EP2242677 in the name of the same applicant.

The same applicant is also the holder of the European patent EP2630026 which relates to a lock device able to perform both the opening and closing of a suitcase for motor vehicles, and to obtain the coupling and releasing of such suitcase with respect to a fixed portion of the motor vehicle, which is able to simultaneously operate the opening/closing and the releasing/coupling, which presents an extremely simple, economical and particularly functional configuration.

In an alternative embodiment also described in EP2630026, the actuation is also provided by means of an electromagnetic actuator which can be actuated for example by radio or infra-red waves.

However, such devices of known type are not free from drawbacks.

More particularly, the known devices do not allow selective operation wherein only the opening/closing of the top box or suitcase is operated without simultaneously also operating the coupling/releasing of the top box/suitcase from the support.

SUMMARY OF THE INVENTION

The aim of the present invention is therefore to provide a device for opening/closing and coupling/releasing a top box or a suitcase of a motor vehicle capable of operating according to a selective drive wherein only the opening/closing of the top box or suitcase is operated without simultaneously operating the coupling/releasing of the top box/suitcase from the support.

Within this aim, an object of the present invention is to provide a device for opening/closing and coupling/releasing a top box or a suitcase for a motor vehicle capable of carrying out both the opening and closing of said top box/suitcase, and to obtain the coupling and releasing of such top box/suitcase with respect to a fixed portion of the motorcycle, which is able to solve the drawbacks affecting the devices of a known type from the prior art and which is suitable to allow the user to open the suitcase also without having to use a key.

Another object of the invention is to provide an integrated device for opening and closing a top box or suitcase for motorcycles, as well as for the coupling and releasing of such top box or suitcase to/from the motor vehicle, which can be operated remotely using a radio wave, infra-red or Bluetooth remote control.

These objects according to the present invention are achieved by a device for opening/closing a top box or a suitcase for motor vehicles, as well as for coupling and releasing such top box/suitcase with respect to the motor vehicle, according to what is stated in claim 1.

LIST OF FIGURES

The characteristics and advantages of the device for opening/closing a top box or suitcase for motorcycles, as well as for the coupling and releasing of such top box/ suitcase with respect to the motor vehicle according to the present invention, will become more readily apparent from the following detailed description, provided by way of non-limiting example, referred to the accompanying schematic drawings in which.

DETAILED DESCRIPTION OF THE INVENTION

Figure 1:
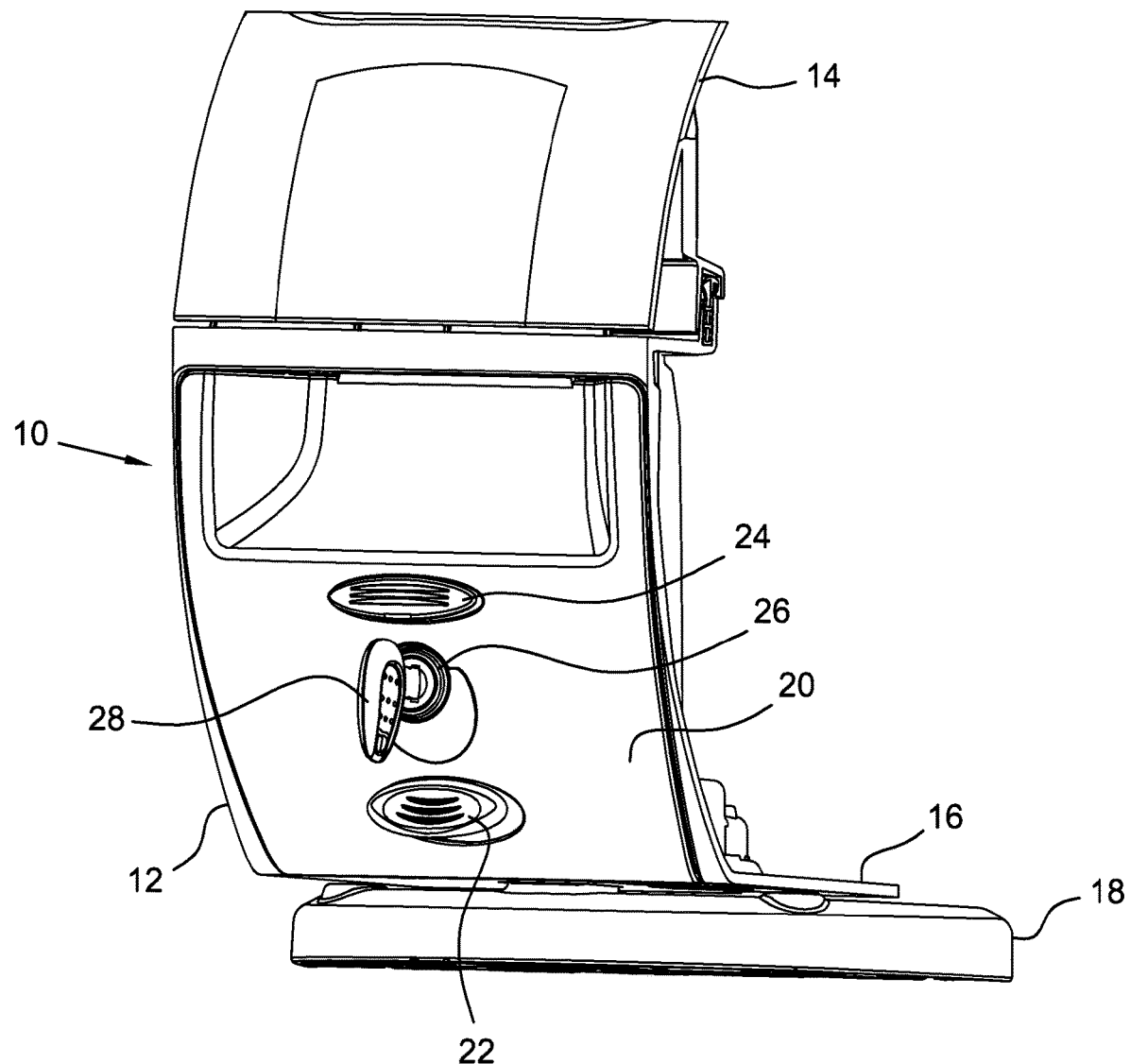
FIG. 1 shows an overall perspective view of a portion of a top box or suitcase applied to a support element and provided with a closing/opening and coupling/releasing device according to the present invention.
Figure 2:
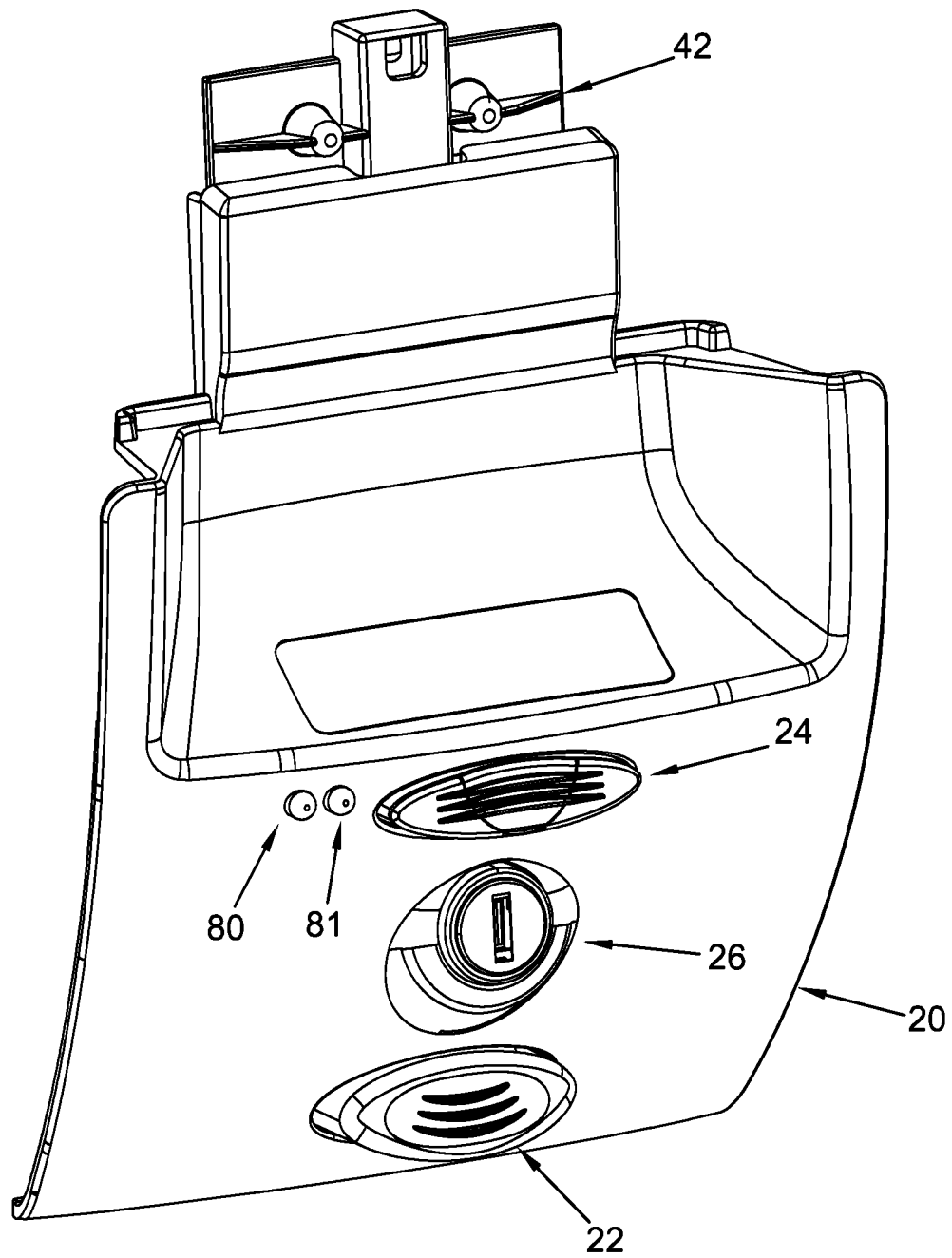
FIG. 2 shows a detailed view of the portion of FIG. 1.
Figure 3:
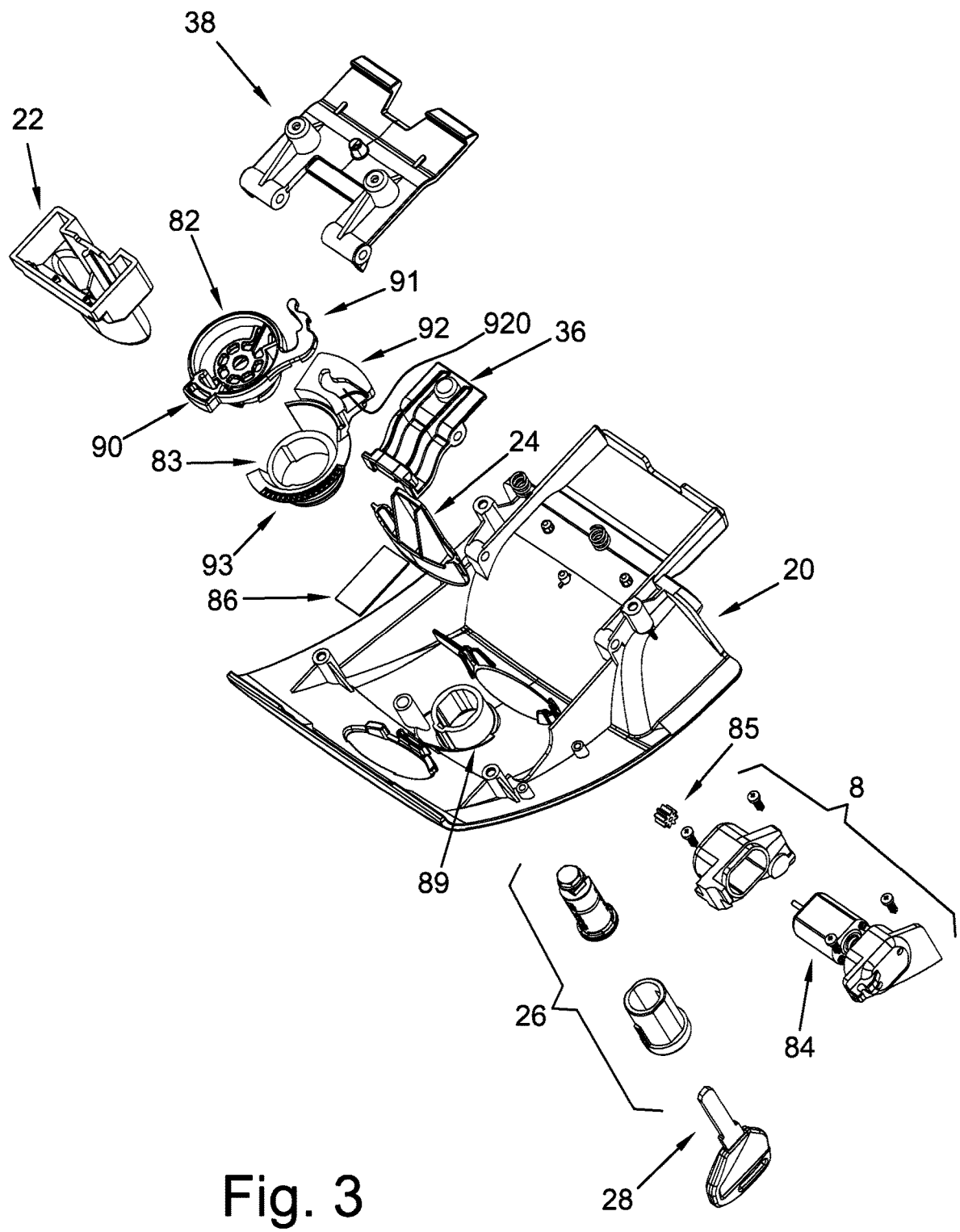
FIG. 3 shows an exploded view of the opening/closing and coupling/releasing components of the device according to the present invention.

The attached figures show exploded views and overall views of the opening/closing device of a top box 10 for motorcycles and for coupling/releasing such top box 10 with respect to a support element 18, for example a plate, in turn connected to a motor vehicle.

The present invention will hereinafter be illustrated with reference, by way of example, to a top box 10 for motor vehicles which comprises a lower shell 12 forming the body of the top box 10 and an upper shell 14 forming the top box 10 cover, said upper shell 14 being hinged to the lower shell 12.

It is however understood that the device according to the present invention can also be applied in association with a suitcase or bag, in particular for motor vehicles, however configured.

According to what is known from the state of the art, on the bottom portion 16 of the lower shell 12 of said top box 10, reversible constraining means to a support plate 18 fixed to the motorcycle are provided.

A plate 20 is associated with the outer surface of the lower shell 12, on which the following is formed:

a first button 22 for releasing the top box from the support plate 18, operatively connected to said reversible constraining means;

a second button 24 for opening the upper shell relative to the lower shell, operatively connected to coupling means 36, 38 hinged to the plate 20 and able to selectively engage a corresponding coupling means 42 integral with the upper shell 14.

A lock block 26 is also associated with said plate 20.

The device according to the present invention further comprises:

a first under-lock body 82 rigidly rotatably constrained to said lock block 26 and which can be rotatably actuated to switch from a configuration of simultaneously locking said first button 22 and said second button 24 to a configuration of simultaneously unlocking said first button 22 and said second button 24 and vice versa;

a second under-lock body 83 which can be rotatably actuated to switch from a configuration of locking said second button 24 to a configuration of unlocking said second button 24 and vice versa.

According to the preferred embodiment of the present invention illustrated here by way of example, the first under-lock body 82 is configured to drag said second under-lock body 83 in rotation in the transition from said simultaneous locking configuration of said first button 22 and of said second button 24 to said simultaneous unlocking configuration of said first button 22 and of said second button 24.

The first under-lock body 82 is connected directly to the lock block 26 therefore, turning the key 28 by 90° causes an equal rotation of the under-lock body 82.

Below the first under-lock body 82 the second under-lock body is mounted 83, which is coupled to the cylindrical part of the key seat 89 machined directly on the hinge plate 20.

Attaching the first under-lock body 82 to the key group, the position of the second under-lock body 83 also locks along the key axis, which as such can only rotate around the seat 89.

The first under-lock body 82 advantageously comprises a radially projecting tooth 90 from said first body and configured to engage with a corresponding tooth 50 formed on said first button 22. When the tooth 90 of said first under-lock body 82 engages said tooth 50 of said first button 22, the actuation of said first button 22 is prevented. More precisely, the translation that allows the unlocking of the top box 10 from the support plate 18 is prevented.

Likewise, said first under-lock body 82 further comprises a radially projecting hook 91 adapted to be inserted inside a seat 920 formed in a radially projecting portion 92 of said second under-lock body 83 so that in the transition from said simultaneous locking configuration of said first button 22 and of said second button 24 to said simultaneous unlocking configuration of said first button 22 and of said second button 24, said first under-lock body 82 drags said second under-lock body 83 in rotation thanks to the relative constraint created between said first 82 and second under-lock body 83 by said hook 91 which is inserted within said seat 920.

It is not possible to open the top box 10 when the radially projecting portion 92 of the second under-lock body 83 engages with the lower end 56 of the coupling means lever 36, as the straight movement of the second button 24 prevents the opening of the upper shell with respect to the lower shell, and consequently the rotation of the hooking tooth 38 is prevented and thus the opening of the top box.

The operation of the device according to the present invention is as follows.

Figure 5:
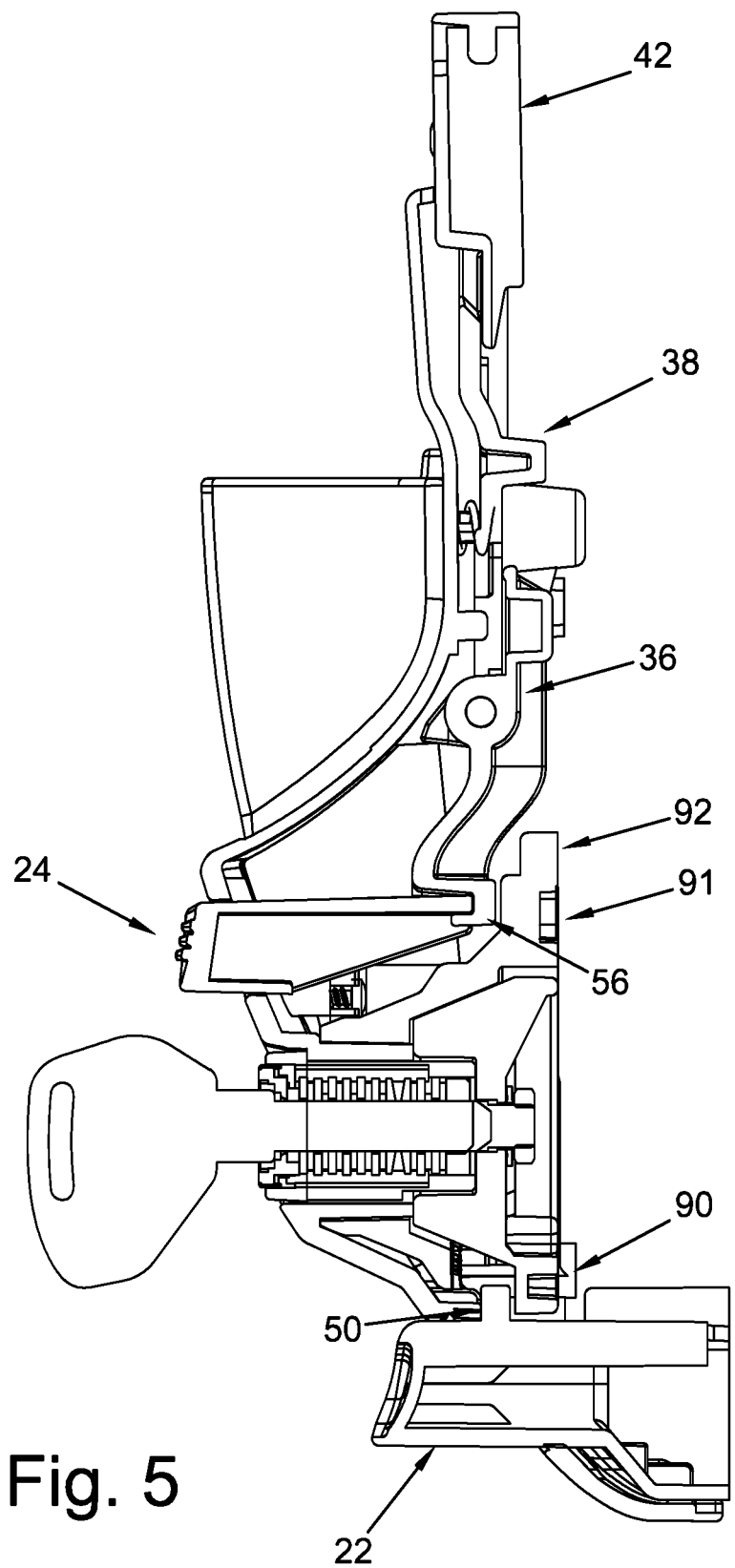
FIG. 5 shows a side section view according to a transverse plane of the view of FIG. 4.
Figure 7:
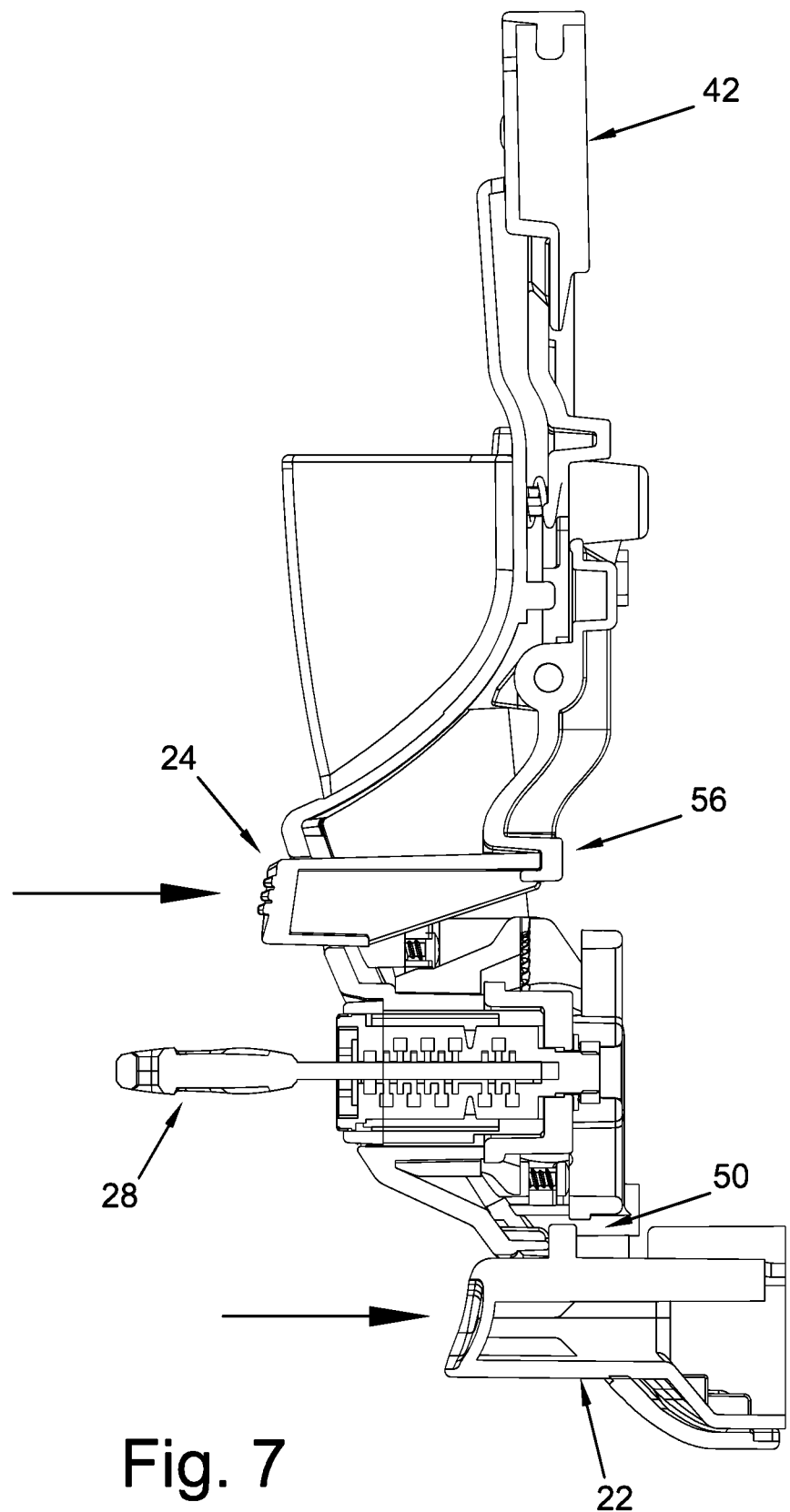
FIG. 7 shows a side section view according to a vertical plane of the view of FIG. 6.

In order to open the top box and/or release it from the plate, it is possible to turn the key 28 90° with respect to the position shown in FIG. 5, thus arriving in the rotated key configuration shown in FIG. 7.

Figure 6:
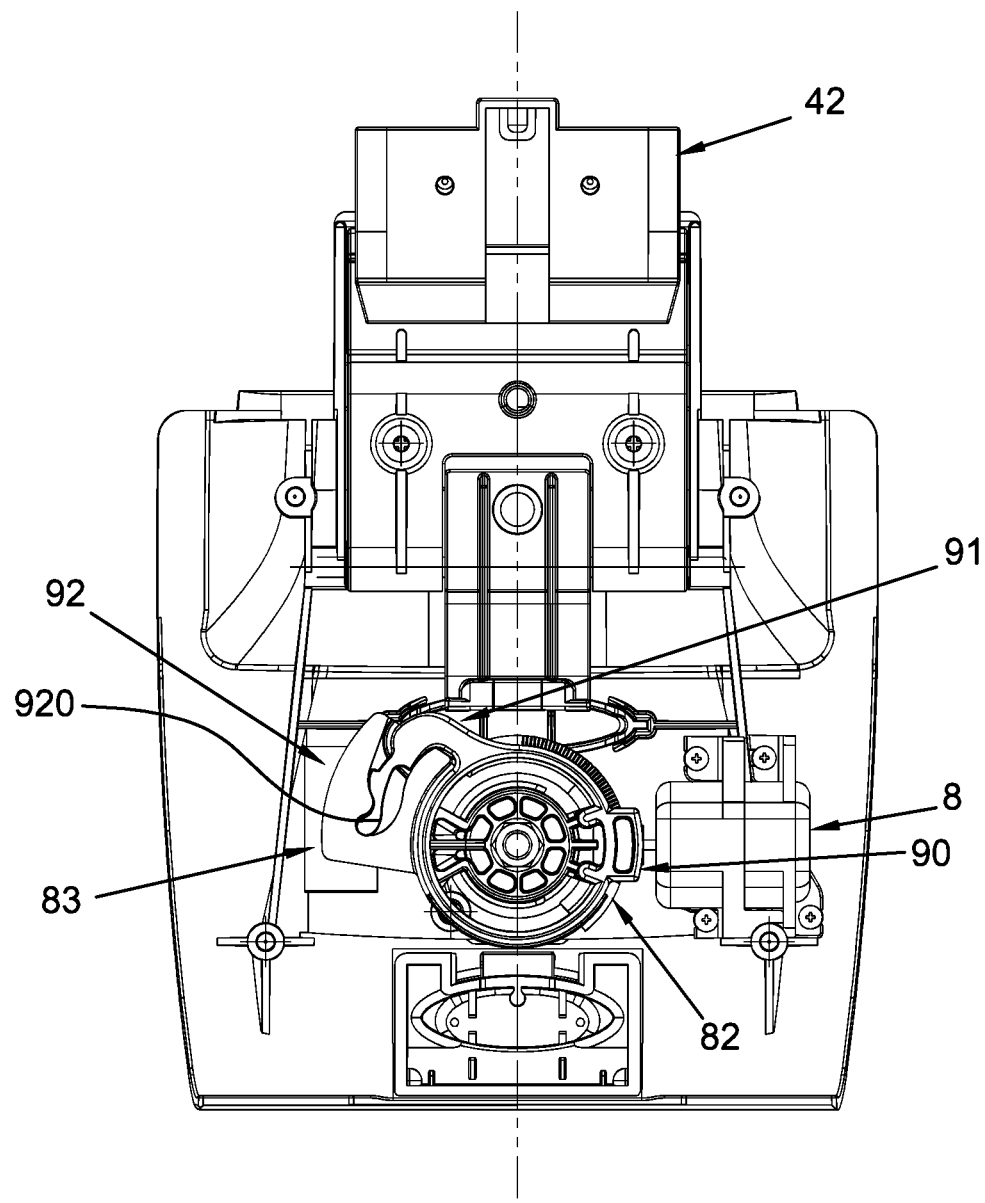
FIG. 6 shows an internal view of the portion of FIG. 1 with the device according to the present invention in a second operating configuration.

Rotating the key causes the rotation of the first under-lock body 82 and, consequently, the insertion of the upper hook 91 in the seat 920 formed in said radially projecting portion 92 of the second under-lock body 83, so that the first under-lock body 82 drives said second under-lock body 83 in the position shown in FIGS. 6 and 7.

In this configuration there is no interference between the shaped radial portion 92 and the lower end 56 of the coupling means lever 36, and it is therefore possible (by pressing) to move the second button 24, thereby opening the top box.

At the same time, in this configuration there is no interference between the lower radial tooth 90 of said first under-lock body 82 and the tooth 50 of said first release button 22, therefore it is possible (by pressing) to move said first button 22 and release the top box from the support element or plate 18.

Advantageously, the device according to the present invention further comprises actuating means 8 adapted to actuate said second under-lock body 83 in rotation to allow the passage from said locking configuration of said second button 24 to said releasing configuration of said second button 24 and vice versa, thereby allowing only the opening/closing of the top box 10 without simultaneously controlling said first coupling/releasing button 22. The device according to the present invention therefore not only makes simultaneous actuation possible by means of the action on the key 28, of both buttons, the first opening/closing button 22 and the second coupling/releasing button 24, but also the selective actuation of only the first opening/closing button 22 of the top box.

More preferably, said actuating means 8 of said second under-lock body 83 comprise a circular rack 93 perimetrally obtained around a portion of said second under-lock body 83 engaging with a pinion 85 actuated by a motor 84, preferably an electric motor connected to an electronic control unit 86.

The electric motor 84 and the electronic control unit 86 can advantageously be powered by special batteries housed near the motor itself, or directly by the battery of the motor vehicle through a special connection system.

Figure 8:
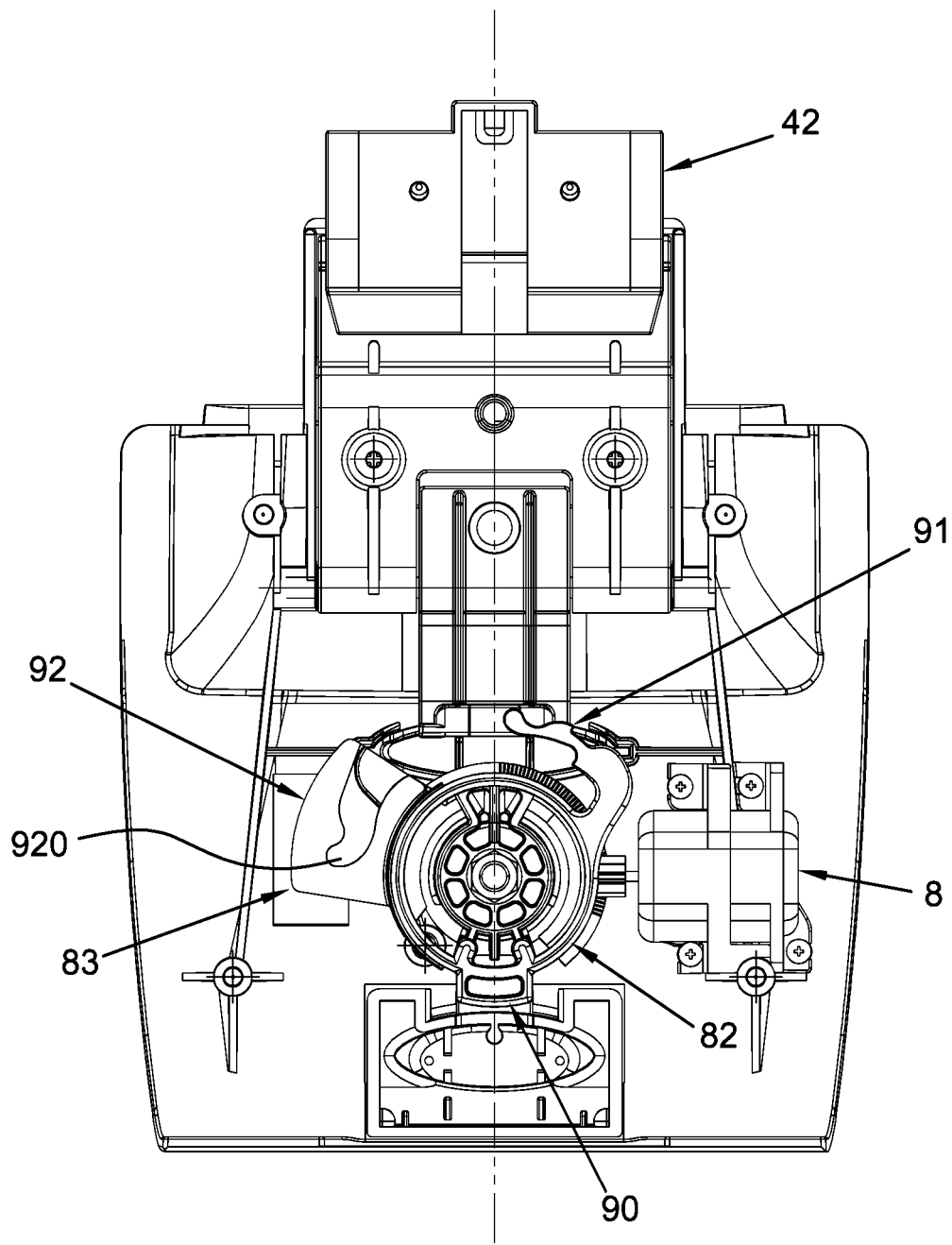
FIG. 8 shows an internal view of the portion of FIG. 1 with the device according to the present invention in a third operating configuration.
Figure 9:
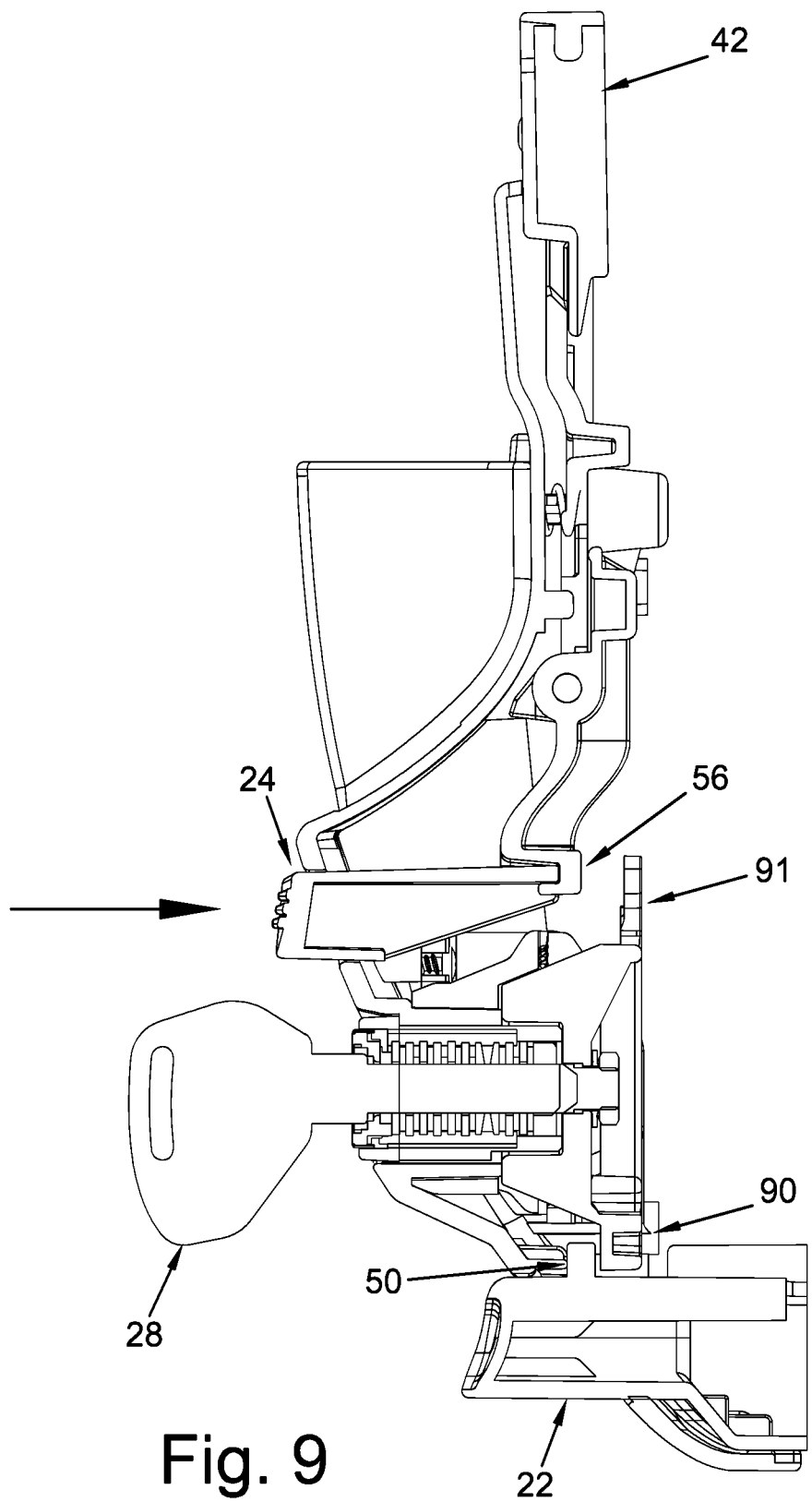
FIG. 9 shows a side section view according to a vertical plane of the view of FIG. 8.

To operate the motor 84 which controls said second under-lock body 83 it is advantageous to use a remote control, or an application (a dedicated App) for smartphones, which can be used to send the opening command to the electronic control unit 86 which controls the rotation of the electric motor 84 which through the pinion 85 connected to it generates the rotation of the second under-lock body 83, which is arranged in the opening configuration of the top box illustrated in FIGS. 8 and 9.

In this configuration there is no interference between the shaped radial portion 92 of the second under-lock body 83 and the lower end 56 of the lever 36, and pushing the second button 24 makes it possible to open the top box while the interference between the tooth 90 of said first under-lock body 82 and the tooth 50 of the first button 22 is preserved, therefore it is not possible to move the first button 22 by pressing it and release the top box.

For safety reasons, the release of the top box from the motorcycle can only be done with the use of the key.

Figure 4:
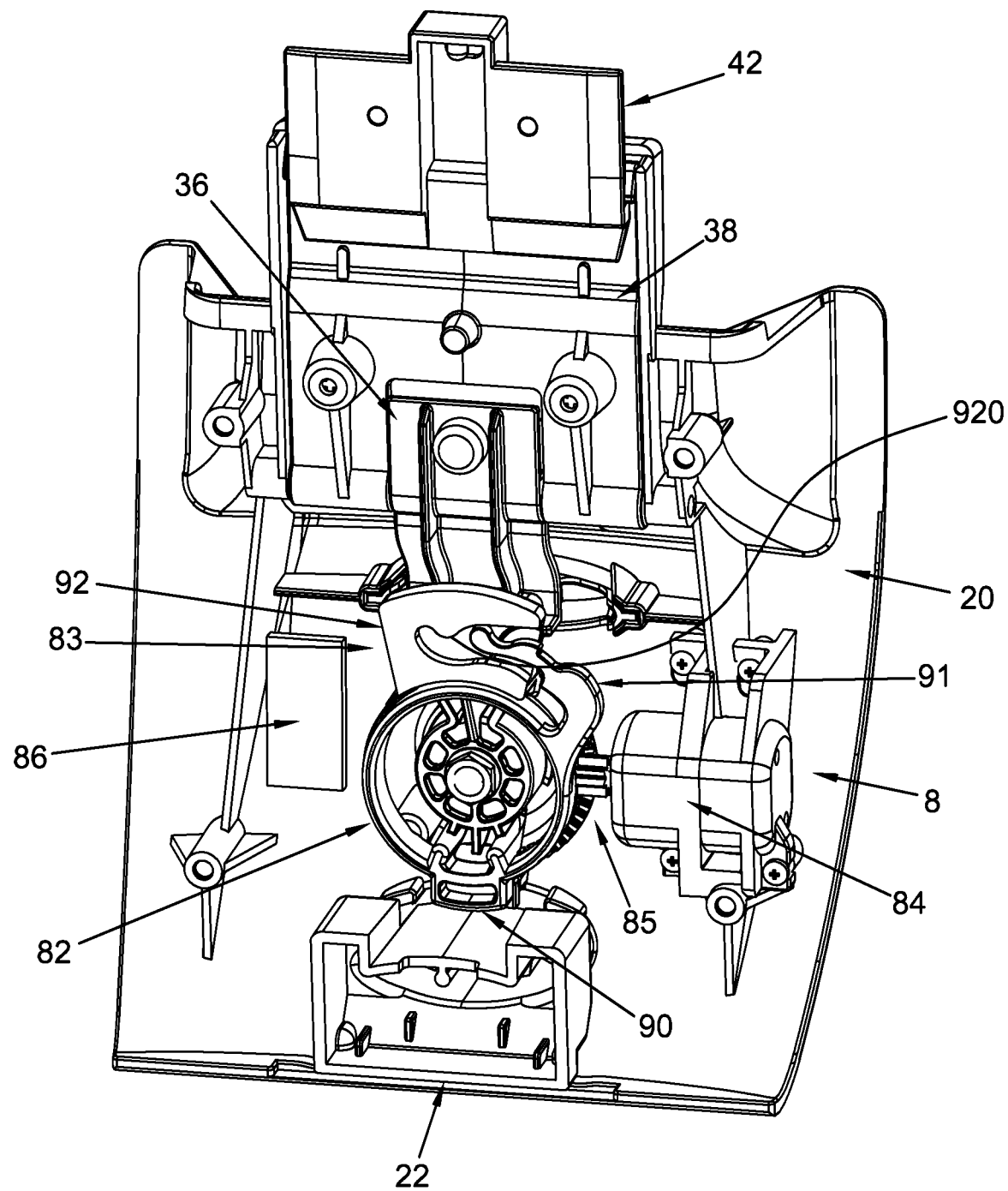
FIG. 4 shows an internal view of the portion of FIG. 1 with the device according to the present invention in a first operating configuration.

The return of the device to the top box's closed position can be carried out by sending the closing command to the electronic control unit 86, thereby generating a reverse rotation of the electric motor 84, and therefore of the pinion 85 and of the second under-lock body 83, until returning to the closed configuration shown in FIG. 4.

From an electronic point of view, the presence of a Bluetooth connection, which is one of the preferred configuration features of the device according to the present invention, makes it possible to generate a predisposition for automatic opening when, for example, the remote control or smartphone come into the reception range of the electronic control unit 86.

For this purpose, preferably said electronic control unit 86 comprises a communication module configured to detect the presence of a mobile terminal within a predetermined distance, and to subsequently control said actuating means 8 so as to allow said second button 24 to be unlocked.

Taking advantage of the Bluetooth communication protocol that establishes a connection between the device and the mobile terminal, when the terminal, constituted for example by a remote control or more preferably by a smartphone, leaves the reception range of the control unit, the latter can be programmed to operate the automatic closure of the top box.

By adjusting the sensitivity of the reception systems, the distances and the methods of implementation can be managed.

An object of the present invention is therefore also a system for opening/closing and coupling/releasing a top box or suitcase for motorcycles, comprising:
  an opening/closing and coupling/releasing device as described previously;
  a mobile terminal comprising an electronic unit configured to communicate with said device by means of a wireless communication protocol.

Advantageously, the electronic unit of said mobile terminal is programmed to send an opening/closing command signal of said top box or suitcase to said device by means of said wireless communication protocol.

As mentioned, advantageously said electronic unit is a smartphone. Preferably, said smartphone will be programmable by means of a dedicated software application (a App).

Preferably, moreover, the device according to the present invention can be provided with visual signalling means of the state of the device itself. For example, the device can comprise a plurality of LED lights configured to indicate the closure status through the indication of LED lights 80, 81.

Advantageously, the visual signalling means 80, 81 can comprise a red LED 80 to indicate a closed condition of the top box and a green LED 81 to indicate an open condition of the top box.

Preferably, a flashing red LED 80 condition can indicate a malfunction of the device.

In the case wherein, for any reason, the actuating means 8 adapted to actuate said second under-lock body 83 in rotation and comprising the electric motor 84 are blocked or do not function correctly when the top box is open (open configuration shown in FIGS. 8 and 9), it is however possible to manually close the top box by rotating the second under-lock body 83, inserting the key 28 and rotating it 90° so that the rotation of the first under-lock body 82 is generated until the upper hook 91 of said first under-lock body 82 fits in the seat 920 formed in a radially projecting portion 92 of said second under-lock body 83. At this point, bringing the key 28 back to the closed position, the said first under-lock body 82 is returned to a closed position, returning to the closed and locked top box configuration visible for example in FIGS. 4 and 5.

From the above description, the characteristics of the opening/closing device of a top box/suitcase for motorcycles and of coupling/releasing such top box/suitcase with respect to a support structure connected to a motor vehicle according to the invention are clear.

It is also understood that the opening/closing and coupling/releasing device of a top box/suitcase for motor vehicles according to the present invention is susceptible to modifications and variations, all of which are within the scope of protection identified by the attached claims, which form an integral part to the descriptive text.

Furthermore, the details provided by way of example can be substituted by technically equivalent elements falling within the scope of protection attributable to the invention.

The invention claimed is:

1. A device for opening/closing a top box or a suitcase for motorcycles and for coupling/releasing such top box/suitcase relative to a support structure fastened to the motorcycle, said top box/suitcase comprising a lower shell, forming the top box body, and an upper shell, forming the cover of the top box and which is hinged to the lower shell, on the bottom portion of the lower shell reversible constraining means to a support element being provided fastened to the motorcycle and a plate being associated on the outer surface of the lower shell, on which plate the following is obtained:
    a first button for releasing the top box from the support plate, operatively connected to said reversible constraining means,
    a second button for opening the upper shell relative to the lower shell, operatively connected to coupling means hinged to the plate and able to selectively engage a corresponding coupling means integral with the upper shell; and
    a lock block,
    a first under-lock body rigidly rotatably constrained to said lock block and which can be rotatably actuated to switch from a configuration of simultaneous lock of said first button and said second button to a configuration of simultaneous unlock of said first button and said second button and vice versa;
    a second under-lock body which can be rotatably actuated to switch from a configuration of locking said second button to a configuration of unlocking said second button and vice versa,
    wherein said first under-lock body is configured to drive in rotation said second under-lock body while switching from said configuration of simultaneous lock of said first button and said second button to said configuration of simultaneous unlock of said first button and said second button.

2. The opening/closing and coupling/releasing device according to claim 1, wherein said first under-lock body comprises a radially projecting tooth configured to be engaged with a tooth of said first button to prevent said first button from being actuated.

3. The opening/closing and coupling/releasing device according to claim 1, wherein said first under-lock body comprises a radially projecting hook adapted to be inserted inside a seat formed in a radially projecting portion of said second under-lock body in such a way that while switching from said configuration of simultaneous lock of said first button and said second button to said configuration of simultaneous unlock of said first button and said second button said first under-lock body drives in rotation said second under-lock body.

4. The opening/closing and coupling/releasing device according to claim 1, wherein it comprises actuating means adapted to rotationally actuate said second under-lock body to allow the switching from said configuration of locking said second button to said configuration of unlocking said second button and vice versa.

5. The opening/closing and coupling/releasing device according to claim 1, wherein said actuating means comprise a circular rack perimetrally obtained around a portion of said second under-lock body engaging with a pinion actuated by a motor.

6. The opening/closing and coupling/releasing device according to claim 1, wherein said actuating means further comprise an electronic control unit which can be remotely controlled.

7. The opening/closing and coupling/releasing device according to claim 6, wherein said electronic control unit comprises a communication module configured to receive an opening/closing command by means of a wireless communication protocol.

8. The opening/closing and coupling/releasing device according to claim 7, wherein said communication protocol is the Bluetooth protocol.

9. The opening/closing and coupling/releasing device according to claim 7, wherein said communication module is configured to detect the presence of a mobile terminal within a predetermined distance and to subsequently control said actuating means so as to allow said second button to be unlocked.

10. A system for opening/closing and coupling/releasing a top box or suitcase for motorcycles, comprising:
    an opening/closing and coupling/releasing device according to claim 6;
    a mobile terminal comprising an electronic unit configured to communicate with said device by means of a wireless communication protocol.

11. A system according to claim 10, wherein said electronic unit of said mobile terminal is programmed to send an opening/closing command signal to said device by means of said wireless communication protocol.

12. System A system according to claim 10, wherein said electronic unit is a smartphone.

13. The opening/closing and coupling/releasing device according to claim 1, wherein it further comprises, at least a pair of LED lights of different colour each suitable to signal one status of said device, configured to be placed outside of said top box or suitcase with which said device is associated, and in a visible position.

* * * * *